Patented Aug. 28, 1928.

1,682,530

UNITED STATES PATENT OFFICE.

CHAUNCEY C. LOOMIS, OF YONKERS, NEW YORK, ASSIGNOR, BY MESNE ASSIGNMENTS, TO LATEX PRODUCTS, INC., OF NEW YORK, N. Y., A CORPORATION OF NEW YORK.

FLOORING.

No Drawing. Application filed August 8, 1923. Serial No. 656,456.

This invention relates to floors and has for its object the provision of an improved flooring and method of laying same.

So-called mastic floors have hitherto been laid by mixing a solution of bituminous material in an organic solvent such as naphtha with a suitable filler such as asbestos or finely divided silica. The resulting paste is then troweled over a wood, concrete, or steel floor or floor foundation and the solvent allowed to evaporate. Alternatively the bituminous material may be melted by application of heat and the filler mixed in. The mixture is then applied hot and rolled out before it has had time to set by cooling. Heretofore it has been impossible to lay a rubber floor by either of these methods. To obtain a workable mix by the solvent method requires such large quantities of solvent as to be wholly impractical, and the rubber cannot be rendered sufficiently plastic by application of heat to be worked and spread with any tools available to the ordinary contractor. As a result, an all rubber floor has been manufactured in central factories by milling a crude rubber and a suitable filler and pressing the product into tiles, blocks, etc. in a hydraulic press and vulcanizing.

I have discovered that a rubber floor can be laid directly with a paste made by mixing a water emulsion of rubber and a suitable filler. Natural rubber latex can be used or an artificial rubber emulsion such as can be obtained by milling crude rubber in any suitable mill such for example as the mill known to the rubber trade as the Premier mill. This has the advantage over the old bituminous or mastic that a true rubber floor is obtained and furthermore the very objectionable and rather expensive organic solvents are eliminated.

It has the advantage over the old type of rubber flooring that it can be laid as a continuous sheet over a flooring of any size or shape. Furthermore, owing to the extreme simplicity it can be both manufactured and laid more cheaply than a rubber tile floor.

Examples.

I. 150 parts of dry amphibole asbestos are mixed with 100 parts of water. 100 parts of latex containing 40% of rubber are then added and the whole is thoroughly mixed. It should be stored in containers to prevent evaporation of the water till ready for use. It is then spread onto the floor by means of a trowel or other suitable tool in a smooth continuous sheet, and allowed to dry. After drying it can be further finished, if desired, by rolling.

II. 150 parts of acid-washed asbestos are spread over the floor. This can be done either by raking out dry asbestos and then rolling it, or by spreading out a mixture of water and asbestos and allowing it to dry. In either case the resulting layer or sheet of asbestos is sprinkled uniformly with 100 parts of latex (containing 40% of rubber) and allowed to dry. If desired, it can be further finished by rolling.

III. 150 parts of asbestos is spread the same as above and is then sprinkled with 150 parts of an artificial emulsion of crude rubber in water, (containing 30% of rubber) to which has been added 5% of colloidal sulphur (on a dry rubber base) and 3% of a strong catalyst or accelerator such as tetramethylthiouram disulphide, diphenylguanidine or paranitrosodimethylaniline finely dispersed in the emulsion. It is then allowed to dry, and, in the presence of the colloidal sulphur and catalyst, a slow cold cure takes place.

IV. A mixture of asbestos and latex such as specified in Example 1 is spread out upon a sheet of burlap or other fabric and allowed to dry. The resulting sheet can then be wrapped into rolls and handled and laid like linoleum, but the rubber sheet thus obtained is far more pliable and more durable than linoleum.

In any of the examples given above, other fillers can be substituted for the asbestos. For example, finely divided silica, china clay, talc, ground wood, ground cork, etc. or mixtures of various fillers to give special properties. I prefer a neutral asbestos filler such as amphibole asbestos or acid-washed asbestos for the reason that I have discovered that a filler which is too basic (e. g. asbestos containing uncombined magnesia or magnesia which can be readily leached out) produces undesirable effects in the finished product of my invention, due, I believe, to a coagulating effect upon the latex. Also pigments or water soluble dyestuffs can be added to give any desired color. But in all cases care should be taken that no materials are included, which, like magnesia, soluble aluminum, iron, barium and calcium compounds, and the like, exercise an objectionable coagulating effect upon the rubber emulsion.

Owing to the hard tough character of the unmilled rubber obtained by direct evaporation of latex, vulcanization of this is not always necessary. If desirable, however, colloidal sulphur and a finely dispersed strong or so-called "super" catalyst can be added and a slow cold cure will be obtained after the mass has been dried. Or, alternatively, the latex can be vulcanized without breaking the emulsion by known means and the vulcanized latex used directly.

Artificial emulsions of rubber or of reclaimed rubber can be used in place of the latex or mixtures with it can be made. Water soluble fillers such as glue, or emulsions of water insoluble materials such as oils, resins, etc. can be added to modify the properties of the rubber, if desired.

In the manufacture of the rubber linoleum, the mix can be either spread upon fabric or the fabric can be omitted if the mix is spread upon a very smooth surface from which it can be peeled after drying.

Flooring compositions obtained in this way with as low as 15% rubber on a dry basis are, I have discovered, quite tough and satisfactory. However, from 20-25% of rubber is preferable. If a very rubbery floor is desired and cost is not of great importance as high as 40-50% of rubber can be added.

If a very thick floor is desired several layers can be put down on top of each other by any of the methods described above. For most purposes, however, a thickness of from ⅛ to ¼ inches is sufficient and this can be readily obtained with one application.

In certain instances when the floor is put down in layers in the manner described in the preceding paragraph, I prefer to incorporate a larger proportion of rubber (preferably more than about 15%) in the top layer or layers than in the remaining layers, which latter may, in some cases, with advantage be put down without any rubber whatever either with or without the aid of a suitable binder such as bituminous material, etc.

I have discovered that my improved flooring as prepared by any of the above described methods is particularly well suited for laying in the form of colored patterns. To accomplish this desirable result I first mix the desired colored pigment or pigments with the prepared paste and fill or lay this into the frames having any desired configuration placed upon the floor in separate frames depending upon the particular design to be employed. These frames are preferably made with thin partitions or containing walls. The space between the frames on the floor may be filled in either with colored or uncolored paste. After the floor has been completely laid in this manner with the plastic paste colored as desired, the frames are then removed and the plastic or semi-plastic flooring subjected to a rolling or pressing operation whereby the crevices left by the removal of the frames are filled in and the separate patterns caused to amalgamate or flow into each other. Or the crevices may be filled in with other flooring material.

I have also found that my improved flooring is capable of being laid in variegated or mottled or marbled colors. This is accomplished by incorporating the desired colored pigment or pigments in the paste and then incompletely mixing these colors through the paste as with a stirring rod whereby irregular or mottled or marbled effects may be obtained.

I have found also that the improved flooring compositions described in the above examples and their modifications may be laid over the older flooring compositions containing bituminous material previously referred to. For example, a thin layer of the older mastic flooring may first be put down which will dry or harden rapidly and the mixture or paste of rubber latex or rubber emulsion and asbestos is then spread over this. A single layer or a plurality of layers containing different proportions of rubber may be put down over the bituminous mastic layer if desired. Or the various layers of bituminous material and latex paste may be laid upon each other in any desired order. I have found that these various layers amalgamate or adhere effectively to each other and produce a good flooring.

I claim:

1. An improved flooring comprising dried non-vulcanized rubber latex and a filler and having a substantially large proportion of its rubber content in and adjacent to one surface thereof.

2. An improved flooring comprising a plurality of layers having different proportions of dried non-vulcanized rubber latex in the several layers.

3. An improved flooring comprising superimposed layers of bitumen-containing material and non-vulcanized dried rubber latex.

4. A rubberized flooring which comprises dried non-vulcanized rubber latex and a pigment distributed in patterned configuration therein.

5. A rubberized flooring which comprises dried non-vulcanized rubber latex and a pigment distributed in irregular configuration therein.

6. As a new article of manufacture a continuous sheet of rubberized material comprising dried non-vulcanized rubber latex and a filler.

7. As a new article of manufacture a continuous sheet of rubberized material comprising between about 15 and 50% by weight of dried non-vulcanized rubber latex and a filler.

8. As a new article of manufacture a continuous sheet of rubberized material comprising between about 15 and 50% by weight of dried non-vulcanized rubber latex and asbestos.

9. As a new article of manufacture a continuous sheet of rubberized material comprising between about 15 and 50% by weight of dried non-vulcanized rubber latex and a filler, and characterized by its strength and high degree of resistance to wear.

In testimony whereof I affix my signature.

CHAUNCEY C. LOOMIS.